(12) United States Patent
Issler

(10) Patent No.: US 8,176,629 B2
(45) Date of Patent: May 15, 2012

(54) METHOD FOR SCREWING SKIRT AND CROWN PARTS OF A METAL PISTON TOGETHER

(75) Inventor: Wolfgang Issler, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 949 days.

(21) Appl. No.: 12/148,409

(22) Filed: Apr. 18, 2008

(65) Prior Publication Data

US 2008/0263861 A1  Oct. 30, 2008

(30) Foreign Application Priority Data

Apr. 27, 2007 (DE) .......................... 10 2007 019 931

(51) Int. Cl.
*B23P 15/10* (2006.01)
*F16J 1/04* (2006.01)

(52) U.S. Cl. .................. 29/888.042; 29/446; 29/525.02; 29/525.11; 92/220; 92/221

(58) Field of Classification Search ............... 29/525.11, 29/525.02, 525.03, 888.042, 888.044, 888.04, 29/446, 450, 505; 92/220, 221

See application file for complete search history.

(56) References Cited

U.S. PATENT DOCUMENTS

| | | | | |
|---|---|---|---|---|
| 4,603,617 A * | 8/1986 | Barth et al. | ..................... | 92/216 |
| 5,305,684 A * | 4/1994 | Melchior | ........................ | 92/187 |
| 6,453,797 B1 * | 9/2002 | Bauer | ............................. | 92/186 |
| 7,302,927 B1 * | 12/2007 | Scharp et al. | ............. | 123/193.6 |
| 7,584,694 B2 * | 9/2009 | Scharp | ............................ | 92/221 |

FOREIGN PATENT DOCUMENTS

DE  10 2005 060 548   12/2006

OTHER PUBLICATIONS

German Search Report with English translation of relevant portions. "Schraubensicherung mit Tellerspannscheiben," Technische Rundschau, vol. 52, pp. 47-48. (German Search Report).

* cited by examiner

*Primary Examiner* — Sarang Afzali
(74) *Attorney, Agent, or Firm* — Collard & Roe, P.C.

(57) ABSTRACT

A method for screwing together two metal parts that are spaced apart from one another close to a screw connection element and elastically deformable relative to one another, and for the remainder lie against one another. In order to obtain a firm and secure screw connection, with little expenditure of torque, one of the metal parts is deformed, before the metal parts are screwed together, in such a manner that regions close to the screw connection element come close to one another, and the metal parts are then screwed together. A region of the one metal parts remains deformed after they have been screwed together, as a result of the screw connection element.

4 Claims, 4 Drawing Sheets

METHOD FOR SCREWING SKIRT AND CROWN PARTS OF A METAL PISTON TOGETHER

CROSS REFERENCE TO RELATED APPLICATIONS

Applicant claims priority under 35 U.S.C. 119 of German Application No. 10 2007 019 931.9 filed Apr. 27, 2007.

BACKGROUND OF THE INVENTION

1. Field of the Invention

The invention relates to a method for screwing two metal parts together.

2. The Prior Art

In the design of a two-part piston consisting of a crown part and a skirt part, which are screwed together, attention is frequently paid to screwing the crown part and the shaft part to one another by way of regions that are elastically resilient and deform when the two parts are screwed together, so that a bias is exerted on the screw connection, which increases the strength of the screw connection.

German Publication DE 10 2005 060 548 A1 describes a two-part piston that is screwed together. The crown part has a bolt that has an outside thread and is disposed coaxial to the piston axis, on the side facing away from the piston crown. The skirt part is delimited, on the piston crown side, by an elastically resilient ceiling region, which has an opening that lies in the center, into which the bolt is introduced when the crown part and the skirt part are screwed together, before a nut is screwed onto the bolt. The ceiling region deforms, so that a bias is exerted on the screw connection between bolt and nut, which bias improves the strength of the screw connection.

However, a great torque must be exerted on the nut in order to bring about deformation of the ceiling region of the skirt part. Since the nut rests against the ceiling region, this torque must also serve to overcome the friction resistance that occurs during the relative movement between nut and ceiling region. This friction resistance is dependent on the composition of the contact regions by way of which the nut and the ceiling region lie against one another. If the composition of the contact regions is disadvantageous, the torque to be applied for screwing the piston together is incorrectly estimated at an overly great friction resistance between nut and ceiling region, so that the screw connection can come loose during engine operation, and an engine defect can occur.

SUMMARY OF THE INVENTION

It is an object of the invention to avoid these disadvantages of the state of the art. This object accomplished by a method for screwing together two metal parts that are spaced apart from one another close to a screw connection element and elastically deformable relative to one another, and for the remainder lie against one another. At least one of the metal parts is deformed in such a manner that regions close to the screw connection element come close to one another. The metal parts are subsequently screwed together, and a region of at least one of the metal parts remains deformed after they have been screwed together by the screw connection element.

The metal parts to be screwed together can be a skirt part and a crown part of a metal piston. The skirt part can have an elastically resilient wall region by way of which the skirt part is screwed to the crown part, and that is deformed before they are screwed together, so that it comes close to the piston crown formed by the crown part.

Alternatively, the crown part can have an elastically deformable floor region by way of which the skirt part is screwed to the crown part, and that is deformed before they are screwed together, so it comes close to a ceiling region formed by the skirt part.

As another alternative, the crown part can have an elastically resilient floor region, and the skirt part can have an elastically resilient ceiling region. The crown part and the skirt part are screwed to one another by way of the floor region and the ceiling region, both of which are deformed before the parts are screwed together, in such a manner that the two regions come close to one another.

Because the metal parts have elastically resilient regions close to the screw connection element, which are deformed by application of force before the parts are screwed together so that they maintain the deformation after the parts are screwed together, activation of the screw connection element with a low expenditure of torque is possible. Furthermore, the deformation of the elastically resilient regions and thus the bias that acts on the screw connection and is supposed to impart strength to the screw connection can be precisely determined in advance, by means of a suitable selection of the force applied. Furthermore, the position of the two parts while they are being screwed together, which is assigned on the bearing side, does not change, since no torque has to be applied.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
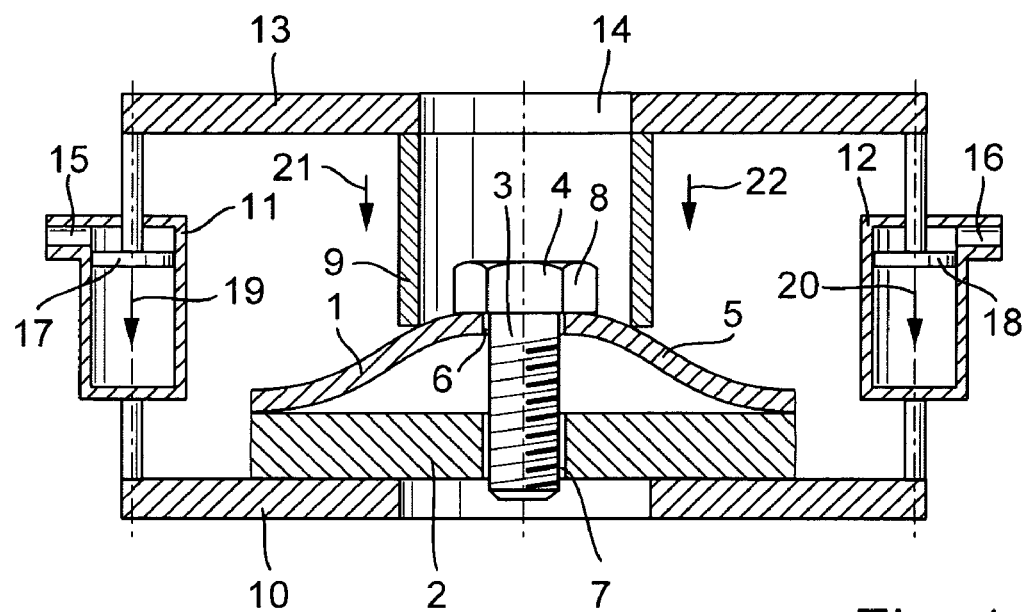
FIG. 1 shows two plate-shaped metal parts that are to be screwed to one another, and lie against one another except for a region close to a hex screw, where they are spaced apart from one another, according to one embodiment of the invention.

Referring now in detail to the drawings, FIG. 1 shows two plate-shaped metal parts 1 and 2 having different wall thicknesses, which rest against one another. Metal part 1, having the lesser wall thickness, has a bulge 5 in the region of a screw connection element 4 configured as a hex screw 3, and is elastically deformable in this region. Hex screw 3 is passed through bores 6 and 7 made in the two metal parts 1, 2, in the region of bulge 5.

A tubular pressure punch 9 lies against metal part 1 in the region of bulge 5, surrounding head 8 of hex screw 3, in such a manner that sufficient room remains between head 8 of hex screw 3 and the inside wall of pressure punch 9, for a nut driver that fits onto screw head 8, which nut driver is not shown in the figure.

Metal part 2 rests against a contact surface 10, the top of which is connected with a hydraulic device 11 and 12, on the two sides of bulge 5 of metal part 1, which devices are connected with a bar element 13 on the side facing away from the contact surface 10. Bar element 13 is connected with pressure punch 9 and has a bore 14 within the contact region between bar element 13 and pressure punch 9, the diameter of which bore is equal to the inside diameter of pressure punch 9.

If oil is introduced into openings 15 and 16 of hydraulic devices 11 and 12 under pressure, pistons 17, 18 disposed on them are put into motion in the direction of arrows 19, 20, which brings about that a force in the direction of arrows 21 and 22 is exerted on pressure punch 9 and thus on metal part 1, in the region of bulge 5.

Figure 2:
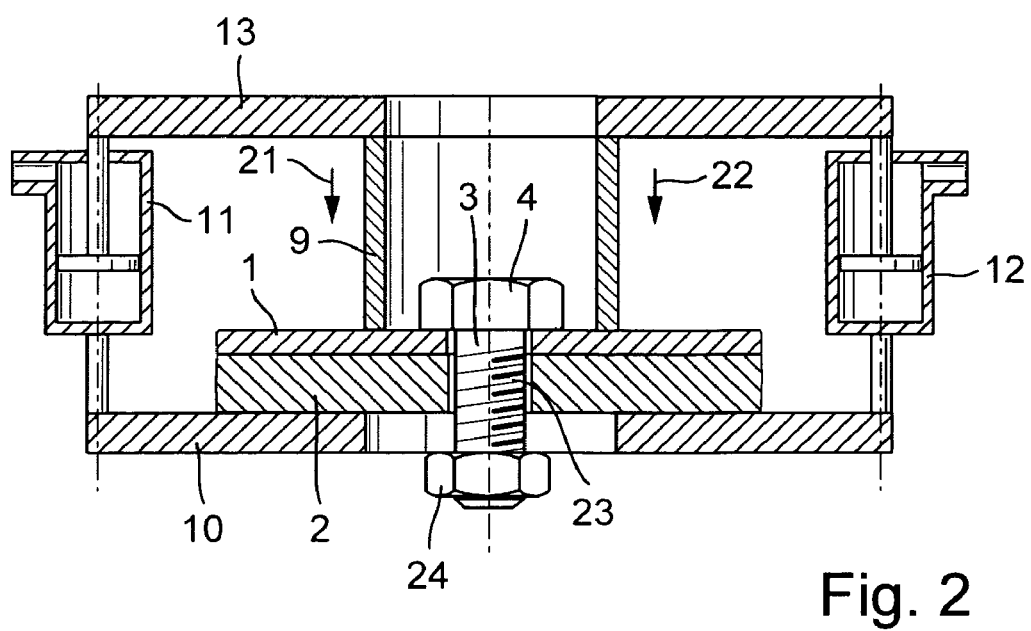
FIG. 2 shows the two metal parts after pressure was exerted on one of the metal parts in the region of the hex screw, by a hydraulic device, and this metal part was deformed to such an extent that both metal parts lie against one another even in the region of the hex screw, after which the two metal parts were screwed together with one another.

As shown in FIG. 2, metal part 1 thereby makes contact with metal part 2 also in the region of hex screw 3. In order to screw the two metal parts 1, 2 to one another, a nut 24 is screwed onto threaded bolt 23 of hex screw 3 in this deformation state of the metal part 1. Afterwards, the pressure of the oil situated in hydraulic devices 11, 12, is reduced to such an extent that bar element 13 and thus also pressure punch 9 are lifted off metal parts 1, 2, and metal parts 1, 2, which are now screwed to one another under bias, can be taken off contact surface 10.

The advantage of the method according to the invention of screwing metal parts to one another, at least one of which metal parts is elastically deformable and is elastically deformed before they are screwed together, by applying an external load, is that screwing the metal parts together is possible with a lower expenditure of torque than if the elastically deformable metal part has to be deformed by the screw force that occurs when the parts are screwed together. Furthermore, the elastically deformable metal part exerts a bias on the screw connection, which brings about a significant improvement in the strength of the screw connection.

Figure 3:
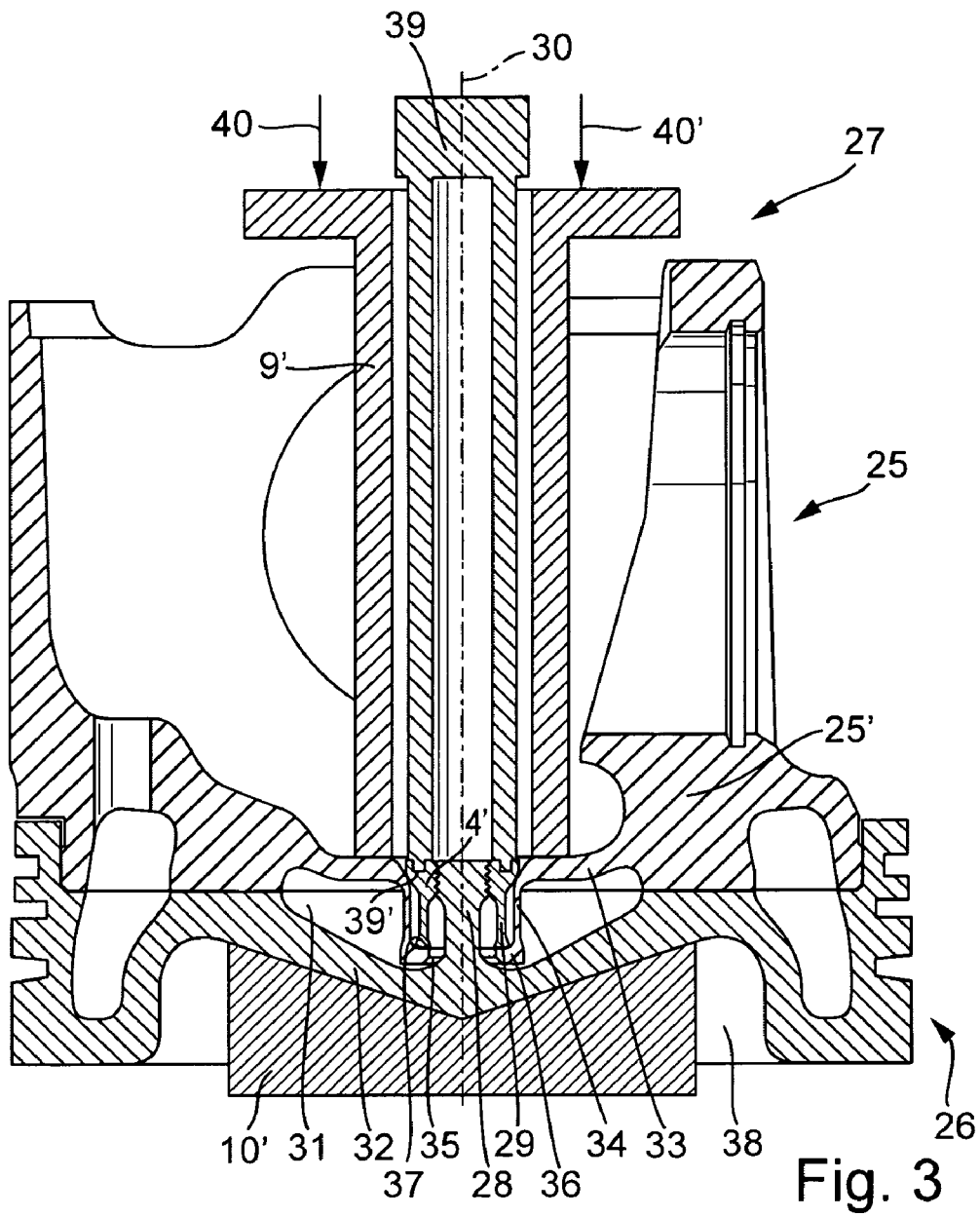
FIG. 3 shows a two-part piston consisting of a crown part and a skirt part, whereby the skirt part has an elastically deformable region close to the screw connection element, which region is deformed before the two piston parts are screwed together.

FIG. 3 shows a piston 27 consisting of a skirt part 25 and a crown part 26 for an internal combustion engine. Piston 27 can consist of steel, gray cast iron, or light metal. Crown part 26 has a threaded bolt 28, which lies coaxial to piston axis 30 and is affixed in the center, on its side facing away from the piston crown. Crown part 26 and skirt part 25 are connected with one another by a screw connection element 4', configured as a sleeve 29, which has an inside thread that fits onto the thread of threaded bolt 28.

In this connection, piston 27, viewed in the radial direction, has a cooling chamber 31 within the pin boss support 25', where skirt part 25 and crown part 26 lie against one another. Cooling chamber 31 is delimited, on the one side, by piston crown 32, and on the shaft side by an elastically resilient wall region 33 of shaft part 25, which region runs out, radially on the inside, into a tubular molded-on part 34, which lies coaxial to the piston axis 30 and is oriented in the direction of the piston crown. Molded-on part 34 has a bore 35 that lies in the center, the diameter of which is greater than that of threaded bolt 28, and the bore has a collar 36 directed radially inward, which is provided, on the skirt side, with a ring-shaped contact surface 37 against which sleeve 29 rests.

In order to screw the skirt part and crown part 25, 26 of the piston 27 together with one another, the skirt part and crown part 25, 26 are placed on top of one another, and, in this connection, threaded bolt 28 is passed through bore 35. In order to obtain a firm screw connection between skirt part 25 and crown part 26 of piston 27, crown part 26 is laid onto a contact surface 10' that matches the shape of combustion chamber 38 of crown part 36, and afterwards, pressure is exerted on wall region 33 of skirt part 25, in the direction of arrows 40 and 40', using a tubular pressure punch 9', to such an extent that wall region 33 deforms in the direction of piston crown 32. Using a special screw element 39 that has bolts 39' on its side facing the screw connection element 4', which bolts fit into depressions on the skirt side of sleeve 29 having a complementary shape, sleeve 29 is screwed onto threaded bolt 28 so far until its piston-crown-side face side makes contact with the skirt-side contact surface 37 of collar 36 of molded-on part 34, without thereby exerting any greater torque on sleeve 29. Subsequently, screw element 39 is withdrawn from sleeve 29, and pressure punch 9' is withdrawn from the piston, so that the deformation brought about by pressure punch 9' in wall region 33 is maintained and exerts a bias on sleeve 29 screwed together with threaded bolt 28, by way of contact surface 37 of the collar 36, which bias imparts great strength to this screw connection.

Figure 4:
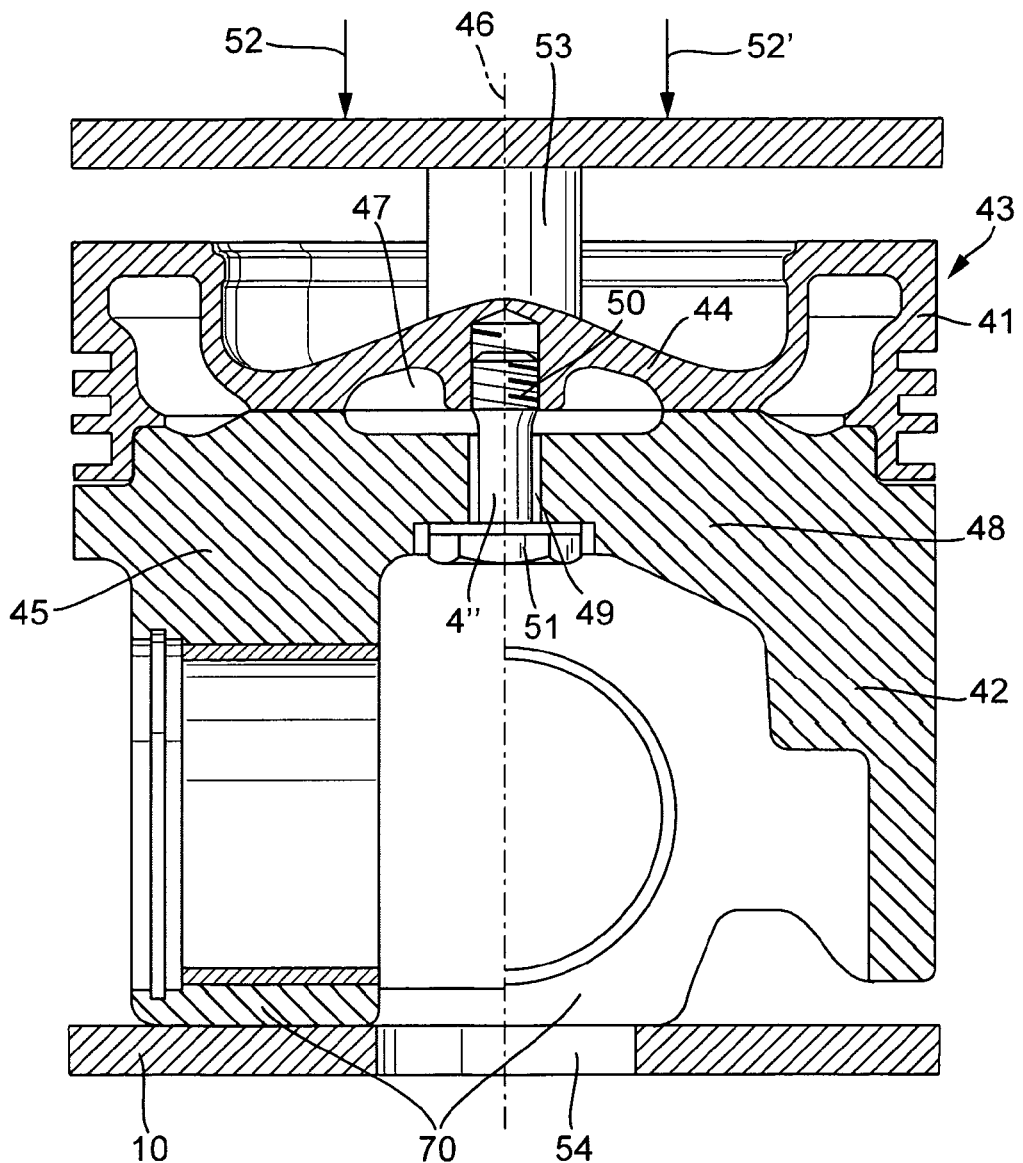
FIG. 4 shows a two-part piston consisting of a crown part and a skirt part, whereby the crown part has an elastically deformable region close to the screw connection element, which region is deformed before the two piston parts are screwed together.

In FIG. 4, a piston 43 consisting of a crown part 41 and a skirt part 42, which are screwed together, is shown, which can consist of steel, gray cast iron, or light metal. Crown part 41 has an elastically deformable floor region 44 close to a screw connection element 4". Crown part 41 and skirt part 42 lie against one another by way of a pin boss support 45. Viewed in the radial direction, piston 43 has an inner cooling chamber 47 disposed coaxial to piston axis 46, within pin boss support 45, which chamber is delimited on the piston crown side by deformable floor region 44 and on the skirt side by piston-crown-side ceiling region 48 of skirt part 42.

In the center, ceiling region 48 has a passage bore 49 that lies coaxial to piston axis 46. On the skirt side, a dead-end bore 50 having an inside thread and disposed coaxial to piston axis 46 is made in floor region 44. Crown part 41 and skirt part 42 of the piston 43 can be screwed to one another by means of a screw connection element 4" configured as a hex screw 51 that can be passed through passage bore 49 and screwed into dead-end bore 50.

In order to screw crown part 41 together with skirt part 42, crown part 41 and skirt part 42 are joined together as shown in FIG. 4, and the two parts are laid onto the contact surface 10 by way of pin boss 70. Subsequently, pressure is applied to floor region 44 of crown part 41, by way of a pressure punch 53, in the direction of arrows 52, 52', by means of a bar element 13' that is connected with contact surface 10 by way of hydraulic devices not shown in FIG. 4, but as shown in FIGS. 1 and 2, to such an extent that in this way, floor region 44 is deformed in the direction of ceiling region 48. While the pressure is being maintained, hex screw 51 is passed through an opening 54 in contact surface 10 and through passage bore 49 in ceiling region 48 of skirt part 42, and screwed into dead-end bore 50, without exerting any overly great torque on hex screw 51 while this is done. Subsequent to this, the pressure being exerted on floor region 44 is reduced, and bar element 13' and pressure punch 53 are lifted off crown part 41, so that piston 43 can be removed from contact surface 10. The deformation of floor region 44 of crown part 41 brought about by exerting pressure is maintained when this is done, and exerts a bias on the screw connection between crown part 41 and skirt part 42, which bias imparts great strength to this screw connection.

Figure 5:
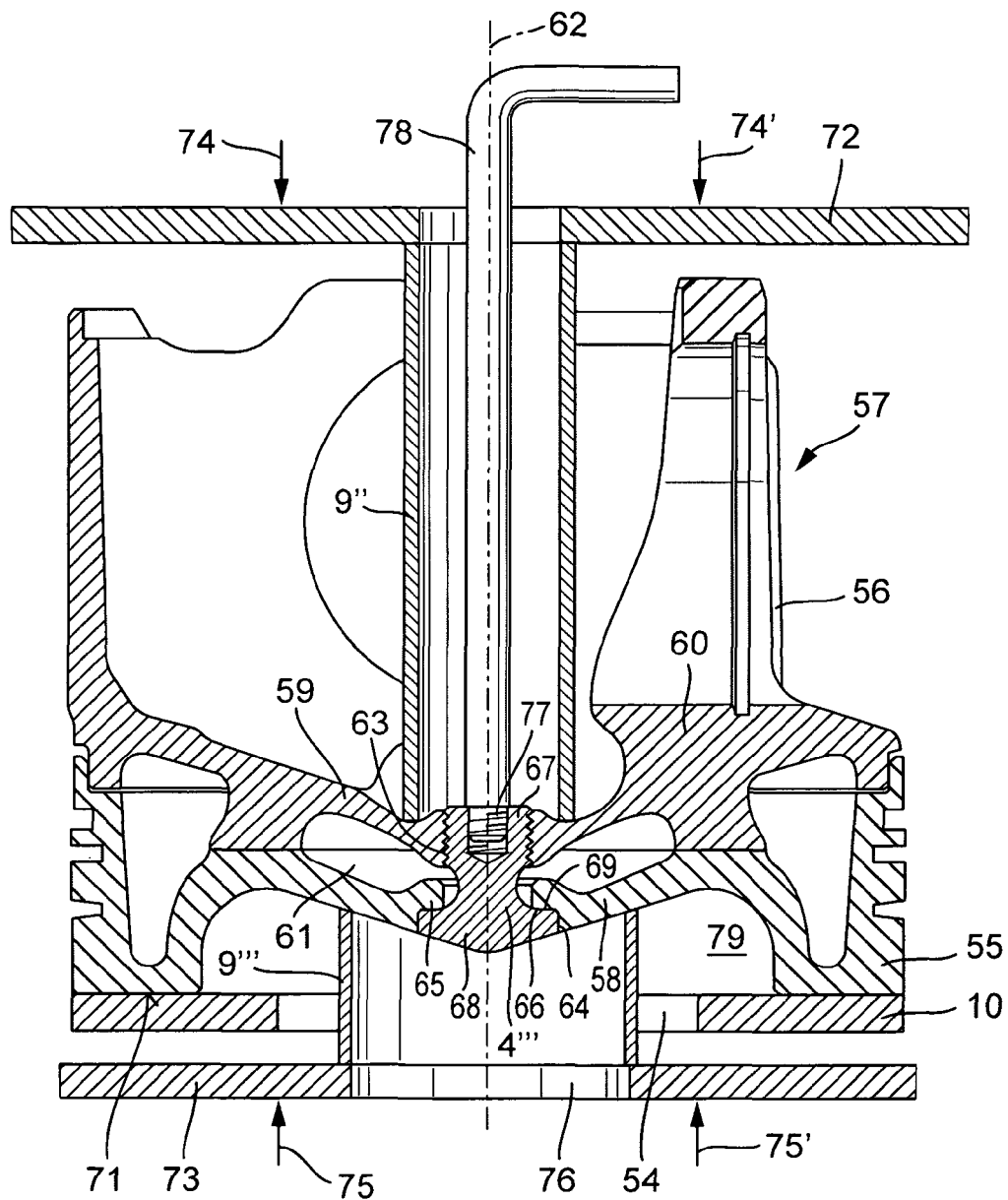
FIG. 5 shows a two-part piston consisting of a crown part and a skirt part, whereby the skirt part and the crown part each have an elastically deformable region close to the screw connection element, which region is deformed before the two piston parts are screwed together.

FIG. 5 shows a two-part piston 57 consisting of a crown part 55 and a skirt part 56, which are screwed together. Piston 57 can consist of steel, gray cast iron, or light metal. Crown part 55 has an elastically resilient floor region 58, and skirt part 56 has an elastically resilient ceiling region 59. Viewed in the radial direction, piston 57 has a cooling chamber 61 disposed coaxial to piston axis 62 within pin boss support 60, which chamber is delimited on the piston crown side by floor region 58 and on the skirt side by ceiling region 59.

In the center and coaxial to piston axis 62, a passage bore 63 having an inside thread is made in ceiling region 59 of skirt part 56. Floor region 58 of crown part 55 has a passage bore 64 in the center and coaxial to piston axis 62, which bore is provided, on the skirt side, with a collar 65 directed radially inward, which collar has a ring-shaped contact surface 66 on the piston crown side. Crown part 55 and skirt part 56 can be screwed to one another by means of a screw connection element 4''' configured as a hex socket head screw 67, whose outside thread fits into inside thread of passage bore 63, and that has a mushroom-shaped molded-on part 68 on the piston crown side. Molded-on part 68 has a ring-shaped contact surface 69 on the skirt side, which makes contact with contact surface 66 of collar 65 in this connection.

Crown part 55 and skirt part 56 of piston 57 are screwed together by joining crown part 55 and skirt part 56 together as shown in FIG. 5, and laying them onto contact surface 10 in such a manner that piston crown 71 makes contact with it. Subsequently, a tubular pressure punch 9" is introduced into the side of skirt part 56 that faces away from the piston crown, and is brought into contact with elastically resilient ceiling region 59 of skirt part 56 on the side facing away from the piston crown. An upper bar element 72 is connected with pressure punch 9". Subsequently, a tubular pressure punch 9''' connected with a lower bar element 73 is passed through opening 54 of contact surface 10 in such a manner that upper face side of pressure punch 9''' makes contact with piston crown 71 in the region of combustion chamber 79, and thus with elastically resilient floor region 58.

In accordance with FIGS. 1 and 2, upper and lower bar elements 72 and 73 are connected by way of hydraulic devices, not shown in FIG. 5, which bring about the result that pressure is exerted on the upper and the lower bar elements 72 and 73 in the direction of arrows 74, 74' and 75, 75'. This pressure is passed on to the floor region 58 and to ceiling region 59 by way of pressure punches 9" and 9''', so that these two regions 58, 59 deform and move towards one another as this happens. Hex socket head screw 67 is passed through passage bore 64 in floor region 58, by way of a central opening 76 in lower bar element 73, and screwed tightly into passage bore 63 having an inside thread, by a hex driver 78 that is introduced into hex socket opening 77, without exerting any overly great torque on hex socket head screw 67 while this is done. Subsequent to this, the pressure exerted on bar elements 72 and 73 is reduced, hex driver 78 is withdrawn from hex socket opening 77 and from pressure punch 9", pressure punches 9" and 9''' are removed from piston 57, and piston 57 is removed from contact surface 10. In this connection, the deformations produced in floor region 58 and in ceiling region 59, brought about by hex socket head screw 67, are maintained, thereby causing a bias to be exerted on the screw connection between crown part 55 and skirt part 56, which bias imparts great strength to this screw connection.

Accordingly, while only few embodiments of the present invention have been shown and described, it is obvious that many changes and modifications may be made thereunto without departing from the spirit and scope of the invention.

REFERENCE SYMBOL LIST 1, 2 metal part
2 region
3 hex screw
4, 4', 4", 4''' screw connection element
5 bulge, region
6, 7 bore
8 head of the hex screw 3, screw head
9, 9', 9", 9''' pressure punch
10, 10' contact surface
11, 12 hydraulic device
13, 13' bar element
14 bore
15 opening in the hydraulic element 11
16 opening in the hydraulic element 12
17 piston of the hydraulic element 11
18 piston of the hydraulic element 12
19, 20, 21, 22 arrow
23 threaded bolt
24 nut
25 skirt part, metal part
25' pin boss support
26 crown part, metal part
27 piston
28 threaded bolt
29 sleeve
30 piston axis
31 cooling oil chamber
32 piston crown, region
33 wall region, region
34 molded-on part
35 bore
36 collar
37 contact surface
38 combustion chamber
39 screw element
39' bolt
40, 40' arrow
41 crown part, metal part
42 skirt part, metal part
43 piston
44 floor region, region
45 pin boss support
46 piston axis
47 cooling chamber
48 ceiling region, region
49 passage bore
50 dead-end bore
51 hex screw
52, 52' arrow
53 pressure punch
54 opening
55 crown part, metal part
56 skirt part, metal part
57 piston
58 floor region, region
59 ceiling region, region
60 pin boss support
61 cooling chamber
62 piston axis
63, 64 passage bore
65 collar
66 contact surface 67 hex socket head screw
68 molded-on part
69 contact surface
70 pin boss
71 piston crown
72 upper bar element
73 lower bar element
74, 74', 75, 75' arrow
76 opening
77 hex socket opening
78 hex driver
79 combustion chamber

What is claimed is:

1. A method for screwing together two metal parts that lie against one another except in regions close to a screw connection element, where in said regions the metal parts are spaced apart from one another and are elastically deformable relative to one another, comprising the following steps:

elastically deforming the region of at least one of the metal parts so that the spaced apart regions of the metal parts close to the screw connection element come close to one another; and screwing the metal parts together after said step of deforming, such that the position of the two parts relative to each other while they are being screwed together does not change, wherein the deformed region of the at least one metal part remains deformed after said step of screwing, as a result of the screw connection element, and wherein the metal parts to be screwed together are a skirt part and a crown part of a metal piston.

2. The method according to claim 1, wherein the step of deforming deforms a region of the skirt part comprising an elastically resilient wall region, by way of wall region the skirt part is screwed to the crown part.

3. The method according to claim 1, wherein the step of deforming deforms a region of the crown part comprising an elastically deformable floor region, and wherein the skirt part is screwed to the crown part by way of this floor region.

4. The method according to claim 1, wherein the step of deforming deforms a region of the crown part comprising an elastically resilient floor region, and a region of the skirt part comprising an elastically resilient ceiling region, and wherein the crown part and the skirt part are screwed to one another by way of the floor region and the ceiling region.

* * * * *